United States Patent [19]

Wood

[11] 4,450,964
[45] May 29, 1984

[54] PROTECTIVE PLASTIC BAG AND METHOD OF UTILIZING THE SAME TO REMOVE ARTICLES FROM A HEPA FILTER HOUSING

[75] Inventor: Joseph A. Wood, Greenville, N.C.

[73] Assignee: Flanders Filters, Inc., Washington, N.C.

[21] Appl. No.: 468,123

[22] Filed: Feb. 22, 1983

[51] Int. Cl.³ .................... B65D 85/00; G21C 9/00
[52] U.S. Cl. ............................ 206/527; 55/502; 55/DIG. 9; 206/525
[58] Field of Search ............ 206/525, 527; 55/429, 55/481, 98, DIG. 9, 502; 176/37

[56] References Cited

U.S. PATENT DOCUMENTS

| | | | |
|---|---|---|---|
| 3,521,675 | 7/1970 | Dussich | 206/527 |
| 3,785,406 | 1/1974 | Delmar | 206/527 |
| 4,193,844 | 3/1980 | Neumann et al. | 55/DIG. 9 |

*Primary Examiner*—William T. Dixson, Jr.
*Attorney, Agent, or Firm*—Bell, Seltzer, Park & Gibson

[57] ABSTRACT

An essentially air tight plastic bag is disclosed, together with a novel method of replacing such bag on the flange surrounding the side access opening of a HEPA filter housing and in accordance with the conventional bag-out, bag-in procedure for removing a potentially contaminated article, such as a filter, from the housing. The novel method includes moving the article through the side access door into the bag, gathering the bag together at a location intermediate the filter in the bag and the open end of the bag, and circumferentially compressing the gathered portion of the bag at two closely spaced apart locations by means of two metal compression bands. The manner in which the bands are applied results in sufficient compressive force at each location to form an essentially solid sealing plug having the appearance and physical characteristics of a rigid, solid rod segment. The bag may then be severed between the two bands to form an outer closed bag portion which encloses the filter, as well as a closed bag stub which remains mounted to the housing flange.

13 Claims, 11 Drawing Figures

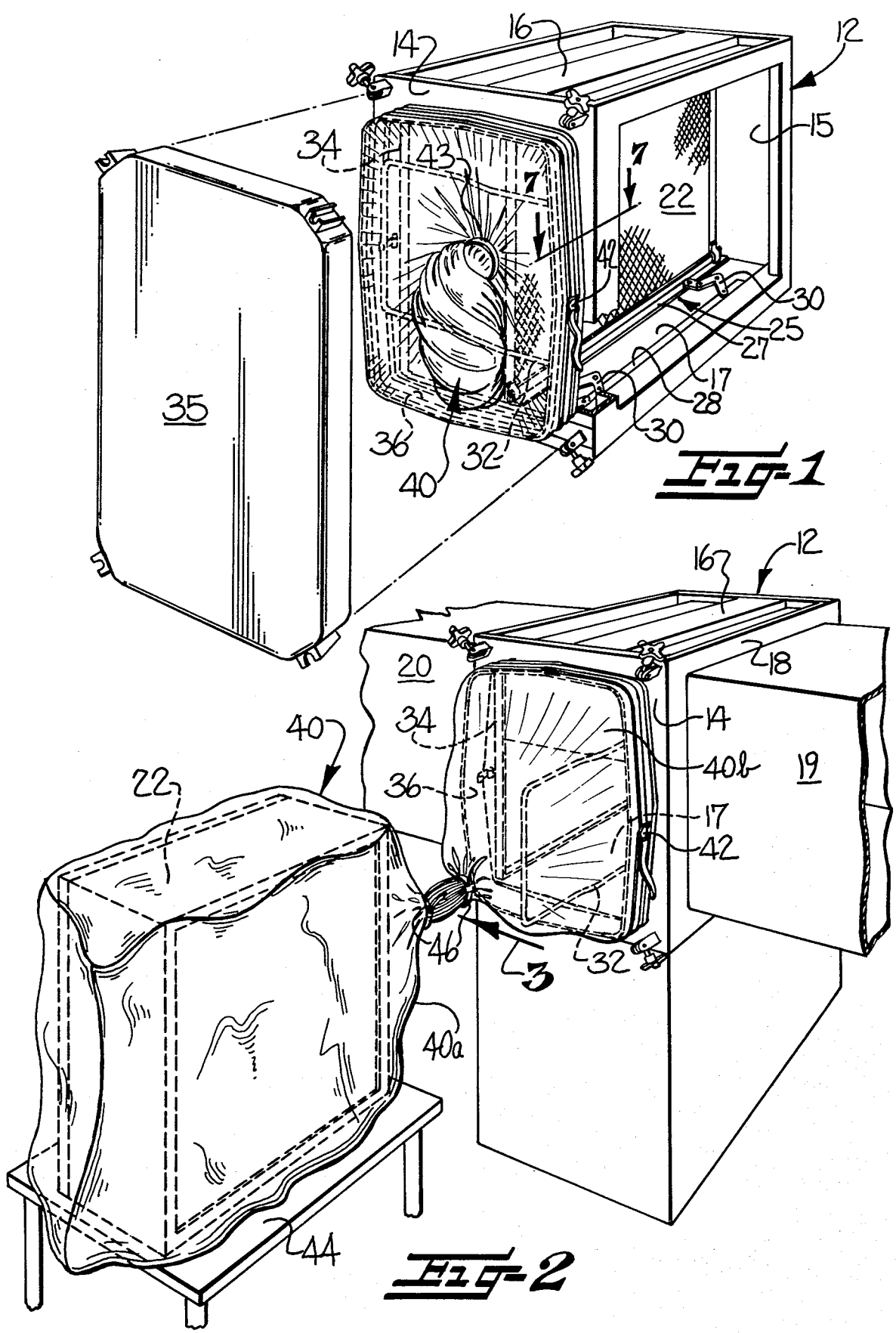

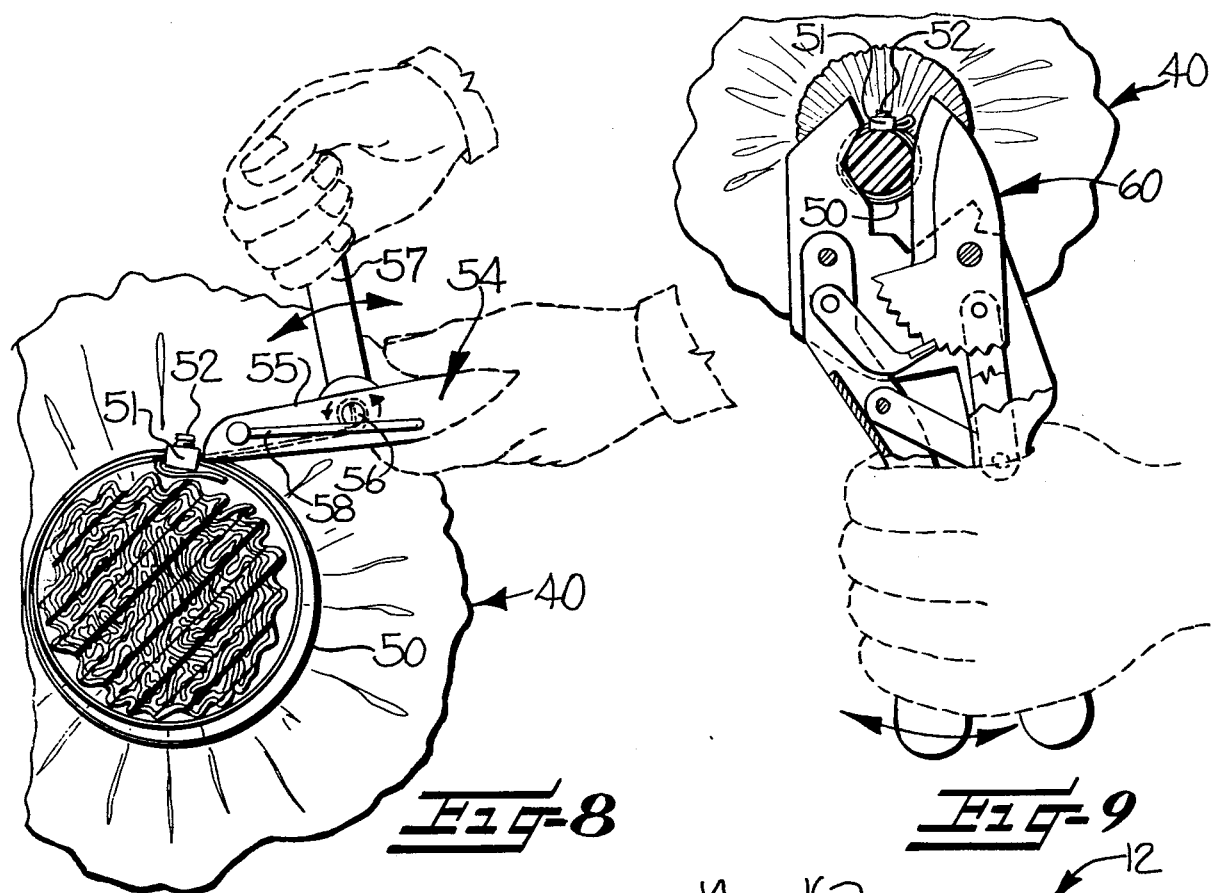
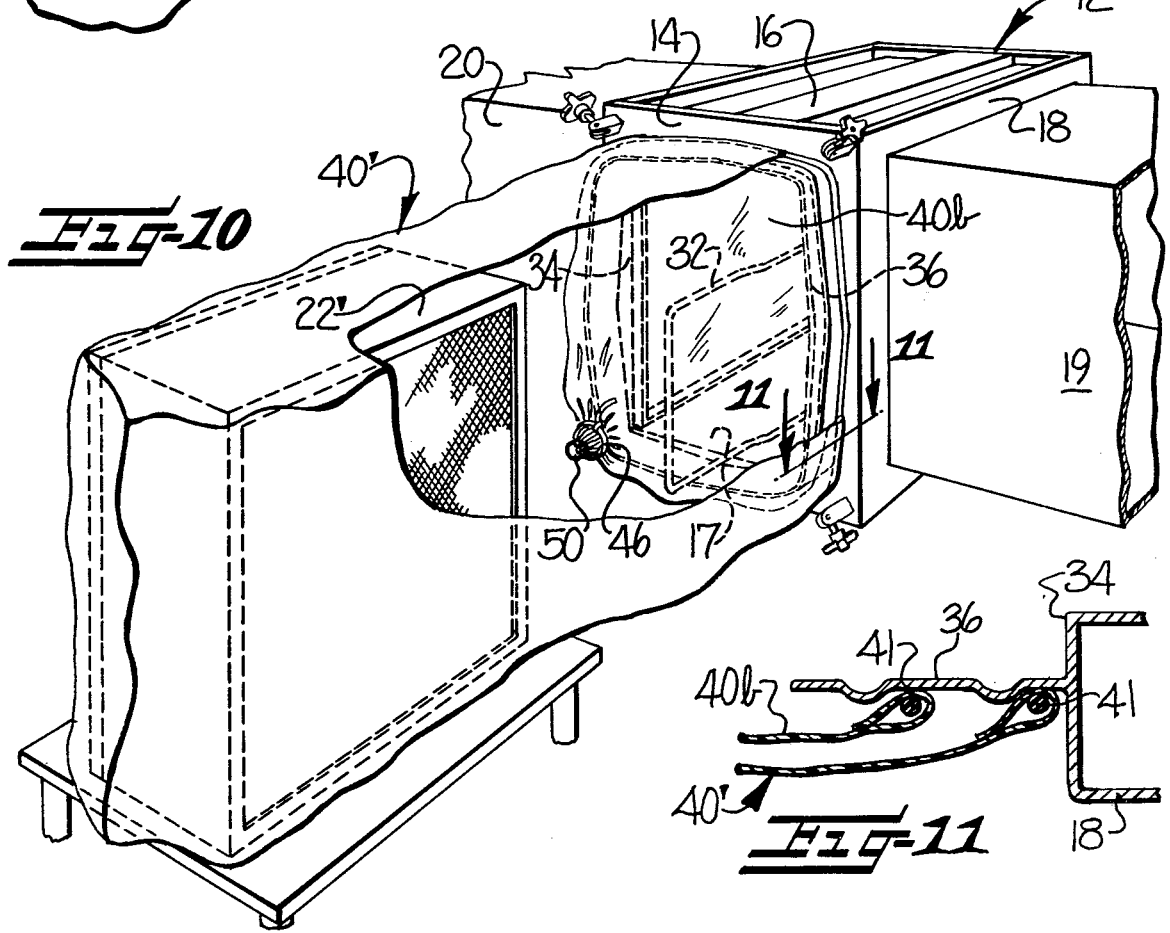

PROTECTIVE PLASTIC BAG AND METHOD OF UTILIZING THE SAME TO REMOVE ARTICLES FROM A HEPA FILTER HOUSING

The present invention relates to a protective plastic bag which is adapted to be used in association with a HEPA filter housing, and to a method of utilizing such bag so as to permit the removal and replacement of internal articles, such as filters, while precluding the release of potentially harmful materials from the housing or articles to the atmosphere.

It is conventional practice to position high efficiency particulate air (HEPA) filters on the downstream side of a critical process for the purpose of containing dangerous by-products, such as radioactive particles, harmful viable organisms, carcinogen agents, or the like, and to thereby prevent the release of such materials to the atmosphere. The housings for filters of this type typically have a rectangular box-like configuration, and include a side access opening in one wall for receiving the filters into the interior of the housing, or removing the dirty and potentially contaminated filters therefrom, with the opening being normally closed by a removable door.

It is also necessary in containment applications to provide a method for the removal and replacement of contaminated filters without direct operator contact with the filters. For this purpose, a peripheral flange is mounted so as to surround the side opening in the housing, and the flange is designed to mount the open end of a heavy duty plastic bag. Thus when the door of the housing is opened for filter removal, the bag serves as a barrier between the operator and the contaminated filter inside the housing. By working through the bag, the technician can unseat the filter and draw it into the bag without direct contact. The bag is then flattened across its full width at a point between the filter and the door opening, and the flattened portion is then heat sealed along a transverse line across the bag by means of a heated iron having a wide blade. A cut is then made across the bag along the center of the seal line, and the separated bag and the enclosed filter may then be removed for disposal. The new filter may then be placed in a new bag, and the open end of the new bag mounted on the flange of the side access opening. The sealed stub of the old bag, which remains on the flange, is then dropped into the new bag, and as a final step, the new filter is moved through the opening and into the housing. This procedure is well known in the art, and is commonly referred to as the bag-out, bag-in procedure, note for example "Nuclear Air Cleaning Handbook" Burchsted et al, ERDA 76-21, at page 145.

As will be apparent, the above procedure is time consuming and burdensome, particularly when it is considered that the housing is often located well above floor level, and the operations must be carried out while the technician is standing on a ladder. Also, it is very difficult to form a proper seal across the full flattened width of the bag, since the technician must have a flat ironing surface and some sort of hold down device for the bag whose circumference might be as large as 90 inches. Still further, the temperature setting of the heat sealing iron must be carefully monitored, since an unduly high temperature may result in burning through the bag and the release of the contaminates.

It has also been proposed to seal the bag by twisting the bag into a tight spiral, and then wrapping the twisted portion at two spaced locations with electrical tape. This bag is then cut between the spaced locations, and additional tape is used to seal the cut ends. However, this procedure is also unsatisfactory, in that it produces a closure which is not totally secure and is thus susceptible to leakage of contaminates.

It is accordingly an object of the present invention to provide a simple method for removing a potentially contaminated article from an air duct HEPA filter containment housing or the like, and which effectively precludes the inadvertent release of potentially harmful materials to the atmosphere.

It is a further object of the present invention to provide a plastic bag which is adapted to enclose a contaminated HEPA filter or other housing component of the described type, and which has a closure which is adapted to permanently and effectively prevent the release of contaminates through the open end thereof.

These and other objects and advantages of the present invention are achieved in the embodiment illustrated herein by the provision of a method which includes the steps of moving the potentially contaminated article from the interior of the housing through a side access opening and into a protective bag which has its open end releasably mounted on a flange surrounding the opening. The bag is then gathered together at a location intermediate the article and the open end of the bag, and the gathered portion is then circumferentially compressed at two closely spaced apart locations and with sufficient compressive force at each location to form the compressed plastic material of the bag into an essentially solid air impermeable plug having the appearance and physical characteristics of a rigid, solid rod segment. Finally, the bag is severed intermediate the two locations to form an outer closed bag portion which encloses the article and is free of the housing, and a closed bag stub which remains mounted to the housing flange.

As further subsequent steps, the open end of a new replacement plastic bag may be releaseably mounted on the flange of the housing, with the open end portion of the replacement bag overlying the open end of the bag stub on the flange. The open end of the bag stub may then be removed from the flange and positioned within the replacement bag.

In accordance with the preferred embodiment of the invention, the circumferential compression of the bag includes at each of the two locations the steps of disposing a band circumferentially about the gathered portion so that portions of the band overlap each other, pulling upon the outer free end of the band in a tangential direction while holding the inner end stationary, and then securing the overlapping portions of the band together so as to prevent their relative movement. Also, it is preferred to initially circumferentially cinch the gathered portion of the bag at two relatively widely spaced apart positions, and then circumferentially compress the gathered portion at the two closely spaced apart locations between the two cinched positions. This initial cinching procedure serves to facilitate the application of the compression bands about the gathered portion, by holding the bag in a relatively loosely gathered condition.

The resulting closure of both the closed bag portion and closed bag stub is in the form of a circumferential band disposed about the end portion of the bag so as to provide sufficient radial compression to maintain the gathered portion in the form of an essentially solid, air impermeable plug. Where the severing operation includes the use of a heated knife blade, the edge surface adjacent the band is in the form of a fused continuous plastic layer.

Some of the objects of the invention having been stated, other objects and advantages will appear as the description proceeds, when taken in connection with the accompanying drawings, in which FIG. 1 is a perspective view of a HEPA filter in a supporting housing, with the side access door of the housing removed to expose the protective plastic bag;

FIG. 2 illustrates the housing positioned in an air duct system, and illustrating several of the initial steps in the method of the present invention;

FIG. 8 is a sectional view illustrating the initial stage of the application of one of the compression bands to the gathered portion of the bag;

FIG. 9 is a sectional view illustrating the step of severing the bag at a point intermediate the two compression bands;

FIG. 10 is a view similar to FIG. 2 and illustrating the step of mounting a new replacement bag on the flange of the housing; and FIG. 11 is a sectional view taken substantially along the line 11—11 of FIG. 10.

Figure 3:
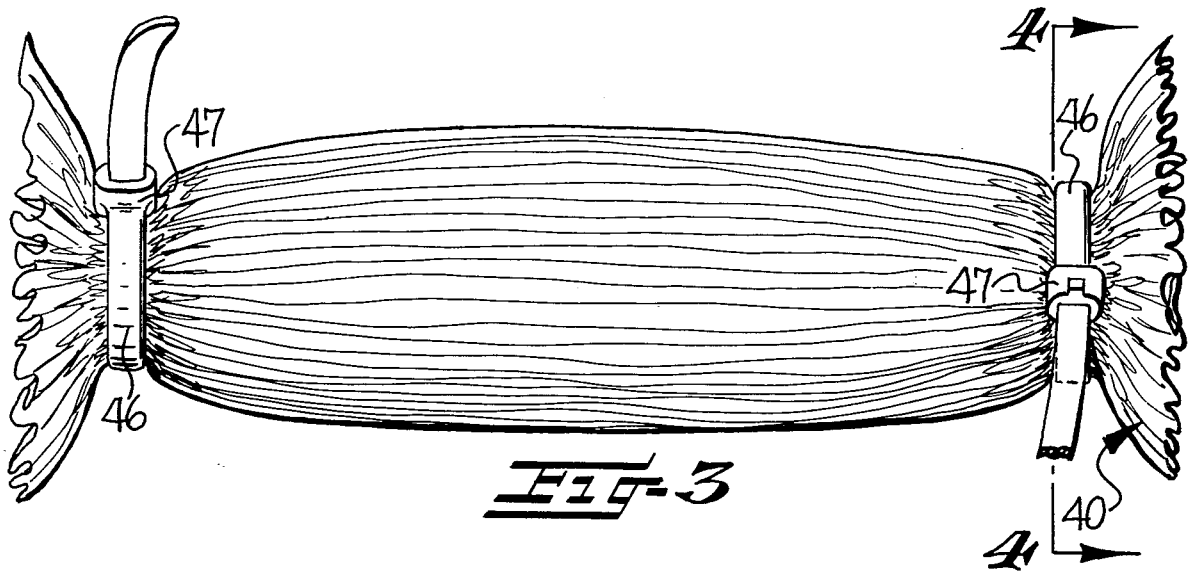
FIG. 3 is an enlarged fragmentary view of the gathered portion of the bag and taken substantially along the arrow 3 of FIG. 2.
Figure 4:
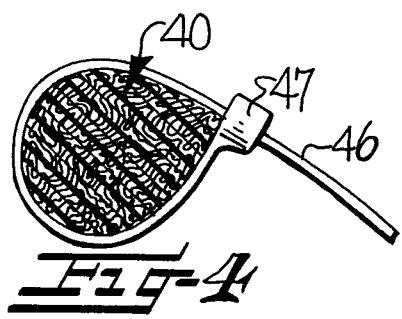
FIG. 4 is a sectional view taken substantially along the line 4—4 of FIG. 3.
Figure 5:
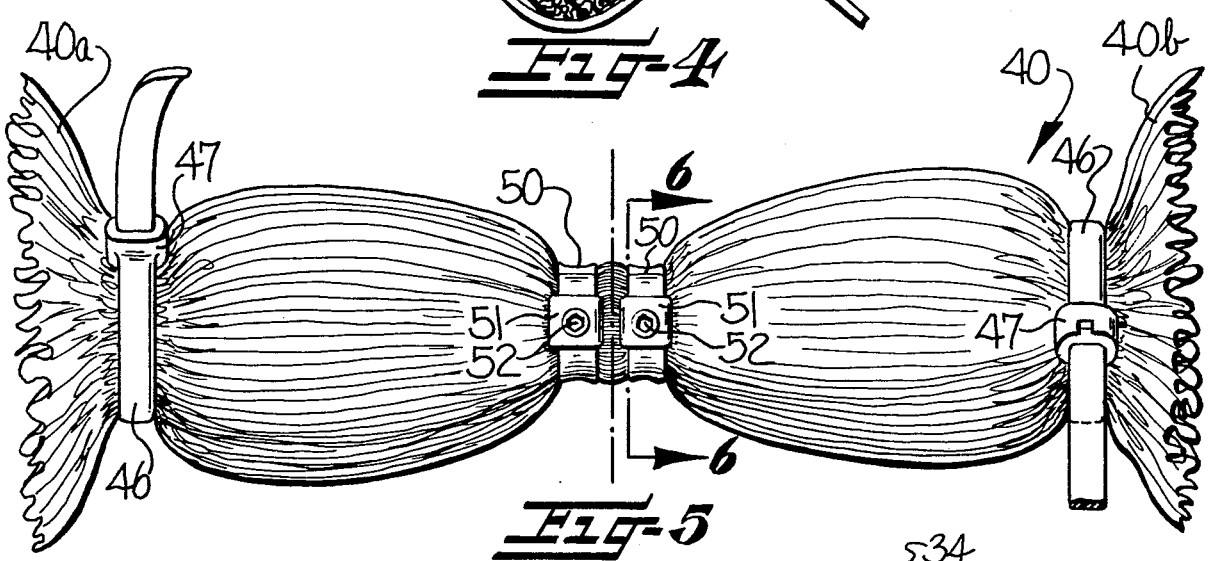
FIG. 5 is a view similar to FIG. 3 and illustrates the gathered portion of the bag after the two compression bands have been applied in closely spaced apart relation.

Referring more specifically to the drawings, there is illustrated a filter housing 12 which is adapted to form a part of an air duct system, such as an exhaust air cleaning system in a nuclear fuel manufacturing facility or a nuclear power plant. The housing 12 comprises a generally box like enclosed rectangular structure having a pair of opposite end walls 14, 15, and top and bottom side walls 16, 17. Also, the housing includes an open front end 18 which is adapted to be joined to an adjacent air duct 19 as seen in FIG. 2, and an opposite open rear end (not shown) which is adapted to be joined to the adjacent duct 20, with the front and rear ends defining the air flow direction therebetween.

In the illustrated embodiment, the housing 12 mounts a single HEPA filter 22 of conventional construction. Typically, such filter measures about 24×24×12 inches in size, and it comprises a wooden or chipboard frame surrounding and supporting a pleated filtering media such as a non-woven fiberglass sheet material. Filters of this type have extremely high dust retention characteristics, usually greater than about 95% efficiency, and typically 99.97% efficiency, in removing particles of 0.3 microns and larger.

Also, a conventional sealing means (not shown) is provided in the housing 12 for sealably mounting the filter 22 therein, and a filter clamping assembly is provided in the housing for seating and unseating the filter against its seal. The clamping assembly may be of conventional design, and as illustrated it includes a clamping mechanism 25 which extends transversely across each of the top and bottom side walls of the housing, and which are generally aligned with each other and with the opening. Each of the clamping mechanisms 25 includes a pair of parallel elongate bars 27, 28 which are interconnected by a number of pivotal linkages 30, so that the lateral separation between the bars 27, 28 may be varied while maintaining their parallel relationship. Also, there is provided a handle 32 which is pivotally mounted within the housing for concurrently actuating both of the mechanisms 25, either to press the filter against its seal, or withdraw the filter from the seal to permit its removal. A further description of the clamping assembly may be obtained from the commonly owned U.S. Pat. No. 4,324,568.

Figure 7:
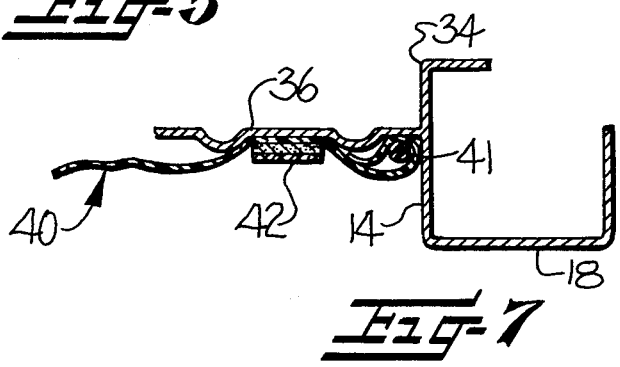
FIG. 7 is a sectional view taken substantially along the line 7—7 of FIG. 1 and illustrating the open end of the bag mounted on the flange of the housing.

The filter 22 is adapted to be inserted and removed from the housing through the side access opening 34 in the end wall 14, with the opening 34 normally being closed by the removable door 35. Also, a peripheral flange 36 is mounted on the end wall 14 and surrounds the opening 34. As noted above, it is conventional practice to position a protective plastic bag 40 to cover the side access opening 34 and thereby prevent the release of potentially harmful materials to the atmosphere when the door 35 is removed. The bag 40 is typically composed of a relatively heavy but flexible thermoplastic sheet material, such as a polyvinyl chloride bag having a thickness of about eight mils. The open end of the bag includes a peripheral elastic shock cord 41 mounted within a folded edge (note FIG. 7), and the open end is releaseably sealed upon the flange by means of a strap 42.

Upon it becoming necessary to replace the filter 22, or some other component in the housing such as a broken portion of the clamping assembly, the technician will effect removal by first removing the door 35 to expose the bag 40 in the manner shown in FIG. 1. The bag is illustrated as being held in a twisted and gathered configuration by a holding strap 43, which is conventional practice. The strap 43 is removed by the technician to permit the bag to be expanded into a fully open configuration. Next, the technician, while working through the bag, releases the clamping assembly by pivoting the handle 32, and then pulls the released filter outwardly through the opening and into the bag. The filter is moved to a point adjacent the bottom of the bag 40, and is then supported on an adjacent table 44 or other exterior support.

In accordance with the method of the present invention, the technician next manually gathers the bag together at a location intermediate the article in the bag and the open end of the bag which is mounted on the flange 36. This gathering procedure preferably includes disposing a plastic band 46 about the gathered portion of the bag at each of two positions, which are spaced apart a distance of about six to eight inches, and then manually tightening the plastic bands about the gathered portion of the bag, to achieve the configuration shown in FIG. 3. Plastic bands of this type are commercially available, and include a head 47 at one end which permits the free end of the band to be slipped therethrough in one direction, while precluding movement in the opposite direction. Thus upon pulling the free end through the head 47, the bag may be cinched and held in a relatively loose fashion as illustrated in FIG. 3.

Figure 6:
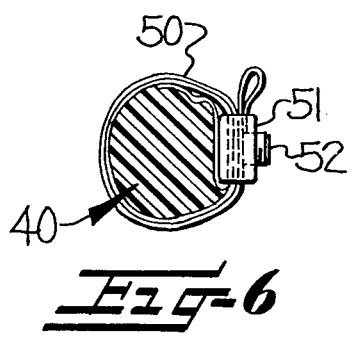
FIG. 6 is a sectional view taken substantially along the line 6—6 of FIG. 5.

The technician now circumferentially compresses the gathered portion of the bag at two closely spaced apart locations between the two cinching bands 46, and with sufficient compressive force at each location to form an essentially solid sealing plug as shown in FIG. 6. This operation includes the use of two metal compression bands 50 which include a buckle 51 fixed at one end thereof, with the buckle including a locking set screw 52. Each band 50 is disposed circumferentially about the gathered portion of the bag, and the free end of the band is slipped through the buckle 51. In the preferred and illustrated embodiment, the free end is looped twice about the bag and is disposed twice through the buckle in the manner best illustrated in FIG. 8. Also, the two bands 50 are closely adjacent each other, and are spaced only about one eighth to one quarter inch.

A tool 54 of conventional well known design is utilized for tightening the bands 50, and as best seen in FIG. 8, the tool 54 includes a nose 55 for abutting the buckle 51, a post 56 having a slot for receiving the band, and a ratcheting lever arm 57 for rotating the post in one direction. Thus in use, the tool 54 is positioned so as to receive the band through the slot in the post 56. Upon rotation of the lever arm 57, the post is rotated to wrap the band thereon, causing the free end of the band to be pulled in a tangential direction while the buckle 51 and thus the inner end of the band are held stationary. The circumference of the band is thus reduced, and it radially compresses the gathered portion of the bag to such an extent that the plastic material within the band is formed into an essentially solid, air impermeable plug having the appearance and physical characteristics of a rigid, solid rod segment. The overlapping portions of the band are then secured together by rotating the set screw 52 on the buckle, so as to prevent the release of the band. The excess portion of the outer free end of the band is then cut, by a cutting instrument 58 which may also be mounted on the tool 54, and the cut end is looped back into the buckle for protective purposes, note FIG. 6. A band 50 of the described type, as well as a suitable applying tool 54, are commercially available and are sold by Band-It Division, Houdaille Industries, Inc. of Denver, Colo.

To complete the filter replacement operation, the bag 40 is severed intermediate the two bands 50 to form an outer closed bag portion 40a which encloses the filter 22 and which is free of the housing. In addition, the other end of the bag forms a closed bag stub 40b which remains mounted to the housing flange 36. As will be apparent, the close separation of the bands 50 minimizes the opportunity for any contaminants which might be in the bag between the bands to escape to the atmosphere during the severing operation. The severing of the bag may be accomplished by utilizing conventional shears as illustrated at 60 in FIG. 9. Alternatively, the bag may be severed by a heated knife blade, which acts to fusibly seal each adjacent severed edge and thereby provide further security against leakage.

The closed bag portion 40a and contaminated filter 22 may next be removed for suitable disposal, and a replacement bag 40', which encloses a replacement filter 22', may then be releasably mounted on the flange 36 of the housing, with the open end portion of the replacement bag overlying the open end of the bag stub 40b on the flange, note FIGS. 10 and 11. The bag stub 40b may then be removed from the flange, and positioned within the new replacement bag 40'. Finally, the new filter 22' may be then moved through the opening 34 and into the housing 12, where it may be moved against its sealing surface by rotation of the handle 32. The new bag 40' is then twisted and held by a holding strap 43 to again assume the position shown in FIG. 1. The door 35 may then be replaced over the opening 34 to complete the operation.

In the drawings and specification, there has been set forth a preferred embodiment of the invention, and although specific terms are employed, they are used in a generic and descriptive sense only and not for purposes of limitation.

That which is claimed is:

1. A method of removing a potentially contaminated article, such as a filter, from an air duct housing having a side access opening and a protective plastic bag positioned with its open end releasably mounted on a flange surrounding the periphery of the side access opening, and which is characterized by a high degree of reliability in precluding the release of the potentially harmful materials to the atmosphere, and including the steps of moving the potentially contaminated article from the interior of the housing through the side access opening and into the bag, gathering the bag together at a location between the article in the bag and the open end of the bag which is mounted on the flange, disposing a band circumferentially about the thus gathered portion of the bag at each of two closely spaced apart locations and circumferentially tightening each of the bands to produce a sufficient compressive force at each location for forming the compressed plastic material into an essentially solid air impermeable plug having the appearance and physical characteristics of a rigid, solid rod segment, and severing the bag intermediate said two bands to form an outer closed bag portion which is free of the housing and which encloses the article, and a closed bag stub which remains mounted to the housing flange.

2. The method as defined in claim 1 wherein the step of circumferentially tightening each of the bands includes the steps of disposing the band circumferentially about the gathered portion and so that portions of the band overlap each other, pulling upon the outer free end of the band in a tangential direction while holding the inner end stationary and so as to reduce the circumference of the band and thereby radially compress the gathered portion of the bag, and then securing the overlapping portions of the band together so as to prevent their relative movement.

3. The method as defined in claim 2 wherein each band comprises a flat metal strip and includes a buckle fixed at said inner end thereof, and the step of disposing the band about the gathered portion includes sliding the outer free end of the band through the buckle.

4. The method as defined in claim 3 wherein the pulling step includes fixing the outer free end to a rotatable post, and then rotating the post to wrap the free end thereon while supporting the post in a longitudinally fixed position relative to the buckle.

5. The method as defined in claim 4 comprising the further step of cutting the excess portion of the outer free end of the band which extends tangentially from the buckle.

6. The method as defined in claim 3 wherein the step of disposing a band circumferentially about the gathered portion includes looping the band twice around such portion and twice through said buckle.

7. The method as defined in claim 1 wherein the step of severing the bag intermediate said two locations includes moving a heated blade through the bag so as to fuseably seal each adjacent severed edge.

8. The method as defined in claim 1 comprising the further subsequent steps of releaseably mounting the open end of a replacement plastic bag on the flange of the housing, with the open end portion of the replacement bag overlying the open end of the bag stub on the flange, and then removing the open end of the bag stub from the flange and positioning the stub within the replacement bag.

9. A method of removing a potentially contaminated article, such as a filter, from an air duct housing having a side access opening and a protective plastic bag positioned with its open end releasably mounted on a flange surrounding the periphery of the side access opening, and which is characterized by a high degree of reliability in precluding the release of the potentially harmful materials to the atmosphere, and including the sequential steps of moving the potentially contaminated article from the interior of the housing through the side access opening and into the bag, gathering the bag together at a location between the article in the bag and the open end of the bag which is mounted on the flange, circumferentially cinching the gathered portion of the bag at two relatively widely spaced apart positions, disposing a band circumferentially about the gathered portion of the bag at each of two closely spaced apart locations between the two cinching positions and circumferentially tightening each of the bands to produce sufficient compressive force at each location for forming the compressed plastic material into an essentially solid air impermeable plug having the appearance and physical characteristics of a rigid, solid rod segment, severing the bag intermediate said two bands to form an outer closed bag portion which is free of the housing and which encloses the article, and a closed bag stub which remains mounted to the housing flange, releasably mounting the open end of a replacement plastic bag on the flange of the housing, with the open end portion of the replacement bag overlying the open end of the bag stub on the flange, and then removing the open end of the bag stub from the flange and positioning the stub within the replacement bag.

10. The method as defined in claim 9 wherein the circumferentially cinching step includes at each of said cinching positions the steps of disposing a plastic band completely about the gathered portion of the bag, manually tightening the plastic band about the gathered portion, and securing the ends of the plastic band together to relatively loosely retain the gathered condition of the bag.

11. A package comprising a potentially contaminated article, and an essentially air tight plastic bag enclosing the article and comprising a sheet of relatively thin, flexible plastic sheet material formed into a bag, with the open end portion of the bag being gathered into a generally cylindrical configuration, and a circumferential band disposed in radial compression about said gathered end portion and maintaining the gathered portion in the form of an essentially solid, air impermeable plug having the appearance and physical characteristics of a rigid, solid rod segment of the plastic material.

12. The bag as defined in claim 11 further comprising a cinching bag disposed about said gathered open end portion of the bag and spaced from said circumferential band on the side thereof opposite the open end of the bag, and with said cinching band relatively loosely retaining the bag in its gathered condition.

13. The bag as defined in claim 12 wherein said plastic material is thermoplastic, and said end portion includes an outer edge which is formed of a fused continuous plastic layer.

* * * * *